(12) United States Patent
Bhaskar et al.

(10) Patent No.: US 10,360,477 B2
(45) Date of Patent: Jul. 23, 2019

(54) ACCELERATING SEMICONDUCTOR-RELATED COMPUTATIONS USING LEARNING BASED MODELS

(71) Applicant: KLA-Tencor Corporation, Milpitas, CA (US)

(72) Inventors: Kris Bhaskar, San Jose, CA (US); Scott Young, Soquel, CA (US); Mark Roulo, Milpitas, CA (US); Jing Zhang, Santa Clara, CA (US); Laurent Karsenti, Rehovot (IL); Mohan Mahadevan, Livermore, CA (US); Bjorn Brauer, Beaverton, OR (US)

(73) Assignee: KLA-Tencor Corp., Milpitas, CA (US)

( * ) Notice: Subject to any disclaimer, the term of this patent is extended or adjusted under 35 U.S.C. 154(b) by 52 days.

(21) Appl. No.: 15/402,169

(22) Filed: Jan. 9, 2017

(65) Prior Publication Data

US 2017/0200260 A1    Jul. 13, 2017

Related U.S. Application Data

(60) Provisional application No. 62/277,227, filed on Jan. 11, 2016.

(51) Int. Cl.
*G06K 9/00* (2006.01)
*G06K 9/62* (2006.01)
(Continued)

(52) U.S. Cl.
CPC .......... *G06K 9/6256* (2013.01); *G06K 9/627* (2013.01); *G06K 9/66* (2013.01); *G06T 7/0004* (2013.01);
(Continued)

(58) Field of Classification Search
None
See application file for complete search history.

(56) References Cited

U.S. PATENT DOCUMENTS 6,891,627 B1    5/2005  Levy et al.
6,947,917 B1    9/2005  Mathur et al.
(Continued)

FOREIGN PATENT DOCUMENTS

JP    2011-002280    1/2011

OTHER PUBLICATIONS

Chao et al. "Constructing a Wafer Defect Diagnostic System by Integrating Yield Prediction and Defect Pattern Recognition", APIEM, Dec. 10, 2010.*

(Continued)

*Primary Examiner* — Randolph I Chu
(74) *Attorney, Agent, or Firm* — Ann Marie Mewherter (57) ABSTRACT

Methods and systems for performing one or more functions for a specimen using output simulated for the specimen are provided. One system includes one or more computer subsystems configured for acquiring output generated for a specimen by one or more detectors included in a tool configured to perform a process on the specimen. The system also includes one or more components executed by the one or more computer subsystems. The one or more components include a learning based model configured for performing one or more first functions using the acquired output as input to thereby generate simulated output for the specimen. The one or more computer subsystems are also configured for performing one or more second functions for the specimen using the simulated output.

39 Claims, 2 Drawing Sheets

(51) Int. Cl.
*G06K 9/66* (2006.01)
*G06T 7/00* (2017.01)

(52) U.S. Cl.
CPC ............ *G06T 2207/20081* (2013.01); *G06T 2207/20084* (2013.01); *G06T 2207/30148* (2013.01)

(56) References Cited

U.S. PATENT DOCUMENTS

| | | | |
|---|---|---|---|
| 7,162,071 | B2 | 1/2007 | Hung et al. |
| 7,453,584 | B2 | 11/2008 | Li et al. |
| 7,482,890 | B2 | 1/2009 | Tsuzuki et al. |
| 7,517,708 | B2 | 4/2009 | Deshpande et al. |
| 7,570,796 | B2 | 8/2009 | Zafar et al. |
| 7,676,077 | B2 | 3/2010 | Kulkarni et al. |
| 7,831,528 | B2 | 11/2010 | Doddi et al. |
| 8,126,255 | B2 | 2/2012 | Bhaskar et al. |
| 8,664,594 | B1 | 4/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |
| 8,744,607 | B2 | 6/2014 | Kaushal et al. |
| 9,098,891 | B2 | 8/2015 | Kulkarni et al. |
| 9,222,895 | B2 | 12/2015 | Duffy et al. |
| 9,224,660 | B2 | 12/2015 | Kulkarni et al. |
| 2002/0131052 | A1* | 9/2002 | Emery ............ G01N 21/95607 356/511 |
| 2009/0037134 | A1* | 2/2009 | Kulkarni ............ G01N 21/9501 702/127 |
| 2011/0187828 | A1 | 8/2011 | Kim et al. |
| 2011/0320149 | A1* | 12/2011 | Lee .................... G01N 21/9501 702/83 |
| 2013/0077092 | A1 | 3/2013 | Sasazawa et al. |
| 2015/0254394 | A1 | 9/2015 | Hu et al. |
| 2016/0163035 | A1* | 6/2016 | Chang ................ G06K 9/4628 382/149 |
| 2017/0148226 | A1 | 5/2017 | Zhang et al. |
| 2018/0220589 | A1* | 8/2018 | Burden .................... A01G 3/02 |

OTHER PUBLICATIONS

Adly et al., "Machine-Learning Based Identification of Defect Patterns in Semiconductor Wafer Maps: An Overview and Proposal," 2014 IEEE International Parallel & Distributed Processing Symposium Workshops, May 19-23, 2014, pp. 120-429.

Chen et al., "DeepLab: Semantic Image Segmentation with Deep Convolutional Nets, Atrous Convolution, and Fully Connected CRFs," arXiv: 1606.00915v2, Jun. 2, 2016, 14 pages.

Hand et al., "Principles of Data Mining (Adaptive Computation and Machine Learning)," MIT Press, Aug. 1, 2001, 578 pages.

International Search Report for PCT/US2017/012875 dated Apr. 20, 2017.

Jebara, "Discriminative, Generative, and Imitative Learning," MIT Thesis, Feb. 2002, 212 pages.

Kim et al., "A self-learning method for automatic alignment in wafer processing," 7th International Caribbean Conference on Devices, Circuits and Systems, Apr. 28-30, pp. 1-6.

Krizhevsky et al., "ImageNet Classification with Deep Convolutional Neural Networks," NIPS, Jan. 2012, 9 pages.

Kupp et al., "Integrated optimization of semiconductor manufacturing: A machine learning approach," 2012 IEEE International Test Conference, Nov. 5-8, 2012, pp. 1-10.

Sugiyama, "Introduction to Statistical Machine Learning," Morgan Kaufmann, Oct. 9, 2015, 534 pages.

U.S. Appl. No. 15/176,139 by Zhang et al. filed Jun. 7, 2016 (submitted as U.S. Patent Application Publication No. 2017/0148226 published May 25, 2017).

U.S. Appl. No. 15/353,210 by Bhaskar et al. filed Nov. 16, 2016 (submitted as U.S. Patent Application Publication No. 2017/0140524 published May 18, 2017).

U.S. Appl. No. 15/394,790 by Bhaskar et al. filed Dec. 29, 2016 (submitted as U.S. Patent Application Publication No. 2017/0193400 published Jul. 6, 2017).

* cited by examiner

ACCELERATING SEMICONDUCTOR-RELATED COMPUTATIONS USING LEARNING BASED MODELS

BACKGROUND OF THE INVENTION

1. Field of the Invention

The present invention generally relates to methods and systems for performing one or more functions for a specimen using output simulated for the specimen.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc.

Metrology processes are also used at various steps during a semiconductor manufacturing process to monitor and control the process. Metrology processes are different than inspection processes in that, unlike inspection processes in which defects are detected on specimens, metrology processes are used to measure one or more characteristics of the specimens that cannot be determined using currently used inspection tools. For example, metrology processes are used to measure one or more characteristics of specimens such as a dimension (e.g., line width, thickness, etc.) of features formed on the specimens during a process such that the performance of the process can be determined from the one or more characteristics. In addition, if the one or more characteristics of the specimens are unacceptable (e.g., out of a predetermined range for the characteristic(s)), the measurements of the one or more characteristics of the specimens may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on specimens may be independent of the results of an inspection process performed on the specimens. In particular, the locations at which a metrology process is performed may be selected independently of inspection results.

Conventional algorithms used in semiconductor applications generally transform sensory data (i.e., detector output) to something useful. For example, in the case of metrology and inspection, sensory data is used to enable analysis and root cause of failure. In the case of process tools, sensory data is often used to guide the process tools in some sort of control loop fashion. Usually, one has a model that maps this transformation. Such a model is often solved by closed form analytic equations or often by a series of numeric analytic steps. These methods are based typically on physics based solutions (solving Maxwell's equations, doing sensor fusion between different channels, etc.). The implementation of such solutions often involves a massive amount of computational resources, often commonly referred to as an image computer.

In one example related to multi-sensor fusion, in many inspection systems, including optical and electron beam based, there are many channels of data coming in. Current algorithms usually process all of the channels separately and then fuse or vote on the data at the end. This method is performed to maximize signal-to-noise ratio (SNR) for defect detection and for simplicity of understanding what happens. Thus, some defect detection comparison algorithms are run separately on each channel. The image computer costs are thus bloated 2.5× to 3× because it is hard to combine the channels early on. The costs of a typical channel could be $75 K to $100 K.

In a second example, an algorithm may be used to align two images and to interpolate them. Often, this step tends to cost 40% of the image computer costs and in some cases, FPGA are used to implement them. Alignment algorithms also tend to come in two flavors: standard low level normalized cross correlation (NCC) based algorithms that are more amenable to vectorization but have limited range; and feature based alignment that is more robust to distance but harder to implement in vectorizable form. Methods to combine them in a computationally cheap fashion have defied solutions to date.

A third example is a complex physics model such as the near field simulation (thin mask approximation) in semiconductor mask inspection or any method that attempts to do a forward simulation using physics to what exists on a wafer plane. Projections for the 7 nm node and beyond suggest that the computations are essentially intractable, e.g., many days of simulations on a fixed compute budget.

Accordingly, it would be advantageous to develop systems and methods for performing one or more functions for a specimen using output simulated for the specimen that do not have one or more of the disadvantages described above.

SUMMARY OF THE INVENTION

The following description of various embodiments is not to be construed in any way as limiting the subject matter of the appended claims.

One embodiment relates to a system configured to perform one or more functions for a specimen using output simulated for the specimen. The system includes one or more computer subsystems configured for acquiring output generated for a specimen by one or more detectors included in a tool configured to perform a process on the specimen. The system also includes one or more components executed by the one or more computer subsystems. The one or more components include a learning based model configured for performing one or more first functions using the acquired output as input to thereby generate simulated output for the specimen. The one or more computer subsystems are also configured for performing one or more second functions for the specimen using the simulated output. The system may be further configured as described herein.

Another embodiment relates to a computer-implemented method for performing one or more functions for a specimen using output simulated for the specimen. The method includes acquiring output generated for a specimen by one or more detectors included in a tool configured to perform a process on the specimen. The method also includes performing one or more first functions using the acquired output as input to a learning based model to thereby generate simulated output for the specimen. The learning based model is included in one or more components executed by one or more computer systems. In addition, the method includes performing one or more second functions for the specimen using the simulated output. The one or more second functions are performed by the one or more computer systems.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for performing one or more functions for a specimen using output simulated for specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that, the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for accelerating computations performed for semiconductor applications (for metrology, inspection, and process tools) using learning based architectures. For example, one embodiment relates to a system configured to perform one or more functions for a specimen using output simulated for the specimen. The embodiments described herein exploit new learning algorithms and convolutional neural networks (CNNs) to transform a hitherto intractable or super-expensive computational problem into a much simpler and cheaper implementation.

In one example, a basic principle of the embodiments described herein is that deep neural networks when implemented with CNNs and relatively efficient densification processes are an order of magnitude cheaper in computation than conventional algorithms particularly for inference algorithms. In another embodiment, multi-sensor fusion has the potential to be implemented in a much cheaper fashion using the embodiments described herein. Furthermore, given a semiconductor equipment tool including, but not limited to, metrology, inspection, etch, deposition, patterning, etc., where a set of sensors collect data and have a model to map the data to a specific goal (such as defect detection for wafer inspectors such as those described further herein) that leverages a computational engine to render the mapping (from data to defects as an example), the embodiments described herein provide alternative implementations of the computational engine that is 2× to 10× cheaper to implement.

Figure 1:
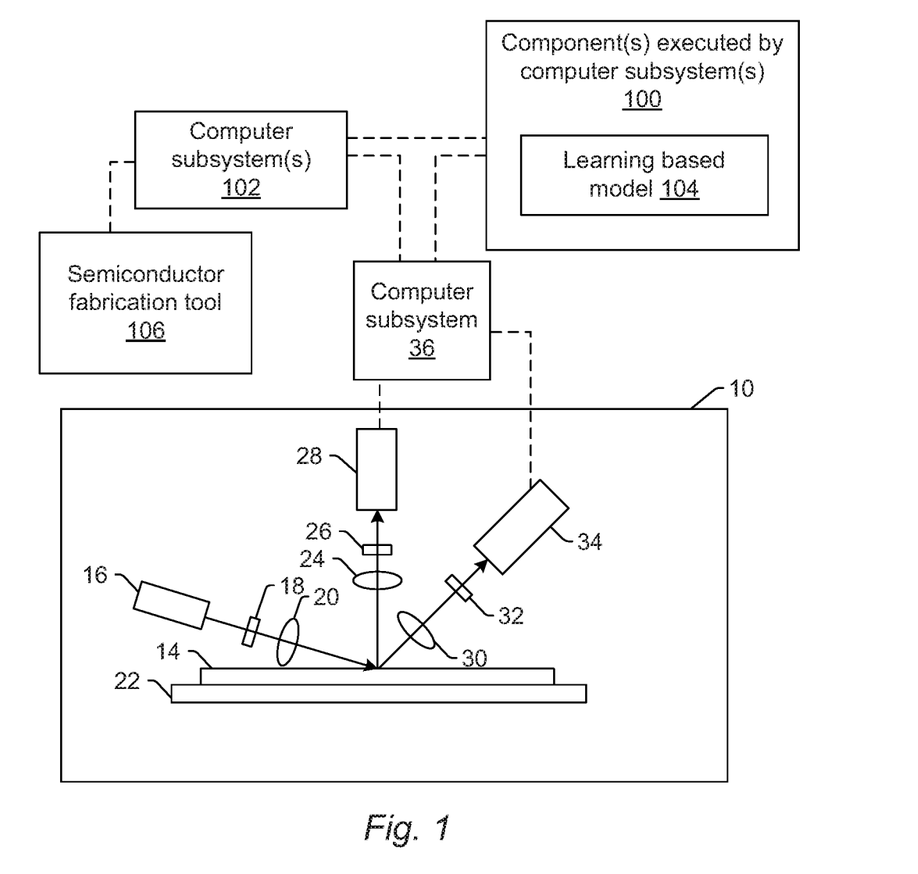
FIGS. 1 and 1a are schematic diagrams illustrating side views of embodiments of a system configured as described herein.

One embodiment of such a system is shown in FIG. 1. The system includes one or more computer subsystems (e.g., computer subsystem 36 and computer subsystem(s) 102) and one or more components 100 executed by the one or more computer subsystems. In some embodiments, output generated for a specimen includes optical based output. For example, the system may include optical based tool 10. In the embodiment of FIG. 1, the optical based tool is configured for scanning light over or directing light to a physical version of the specimen while detecting light from the specimen to thereby generate the optical based output for the specimen. The optical based tool may also be configured to perform the scanning (or directing) and the detecting with multiple modes.

In one embodiment, the specimen is a wafer. The wafer may include any wafer known in the art. In another embodiment, the specimen is a reticle. The reticle may include any reticle known in the art.

In the embodiment of the system shown in FIG. 1, optical based tool 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element IX and then lens 20 to specimen 14 at an oblique angle of incidence. The oblique angle of incidence may include any suitable oblique angle of incidence, which may vary depending on, for instance, characteristics of the specimen.

The optical based tool may be configured to direct the light to the specimen at different angles of incidence at different times. For example, the optical based tool may be configured to alter one or more characteristics of one or more elements of the illumination subsystem such that the light can be directed to the specimen at an angle of incidence that is different than that shown in FIG. 1. In one such example, the optical based tool may be configured to move light source 16, optical element 18, and lens 20 such that the light is directed to the specimen at a different oblique angle of incidence or a normal (or near normal) angle of incidence.

In some instances, the optical based tool may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the optical based tool may be configured to alter one or more of the elements of the illumination subsystem based on the type of illumination to be used for optical based output generation.

The optical based tool may also include a scanning subsystem configured to cause the light to be scanned over the specimen. For example, the optical based tool may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the optical based tool may be configured such that one or more optical elements of the optical based tool perform some scanning of the light over the specimen. The light may be scanned over the specimen in any suitable fashion such as in a serpentine-like path or in a spiral path.

The optical based tool further includes one or more detection channels. At least one of the one or more detection channels includes a detector configured to detect light from the specimen due to illumination of the specimen by the tool and to generate output responsive to the detected light. For example, the optical based tool shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the optical based tool that includes two detection channels, the optical based tool may include a different number of detection channels (e.g., only one detection channel or two or more detection channels). In one such instance, the detection channel formed by collector 30, element 32, and detector 34 may form one side channel as described above, and the optical based tool may include an additional detection channel (not shown) formed as another side channel that is positioned on the opposite side of the plane of incidence. Therefore, the optical based tool may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the optical based tool may also include two or more side channels configured as described above. As such, the optical based tool may include at least three channels (i.e., one top channel and two side channels), and each of the at least three channels has its own collector, each of which is configured to collect light at different scattering angles than each of the other collectors.

As described further above, each of the detection channels included in the optical based tool may be configured to detect scattered light. Therefore, the optical based tool shown in FIG. 2 may be configured for dark field (DF) output generation for specimens. However, the optical based tool may also or alternatively include detection channel(s) that are configured for bright field (BF) output generation for specimens. In other words, the optical based tool may include at least one detection channel that is configured to detect light specularly reflected from the specimen. Therefore, the optical based tools described herein may be configured for only DF, only BF, or both DF and BF output generation. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based tool may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the optical based tool may be configured to generate the optical based output described herein in a number of ways.

It is noted that FIG. 1 is provided herein to generally illustrate a configuration of an optical based tool that may be included in the system embodiments described herein or that may generate optical based output that is used by the system embodiments described herein. Obviously, the optical based tool configuration described herein may be altered to optimize the performance of the optical based tool as is normally performed when designing a commercial optical based tool. In addition, the systems described herein may be implemented using an existing optical based tool (e.g., by adding functionality described herein to an existing optical based tool) such as the 29xx/39xx and Puma 9xxx series of tools that are commercially available from KLA-Tencor, Milpitas, Calif. For some such systems, the embodiments described herein may be provided as optional functionality of the optical based tool (e.g., in addition to other functionality of the optical based tool). Alternatively, the optical based tool described herein may be designed "from scratch" to provide a completely new optical based tool.

Computer subsystem 36 of the optical based tool may be coupled to the detectors of the optical based tool in any suitable manner via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
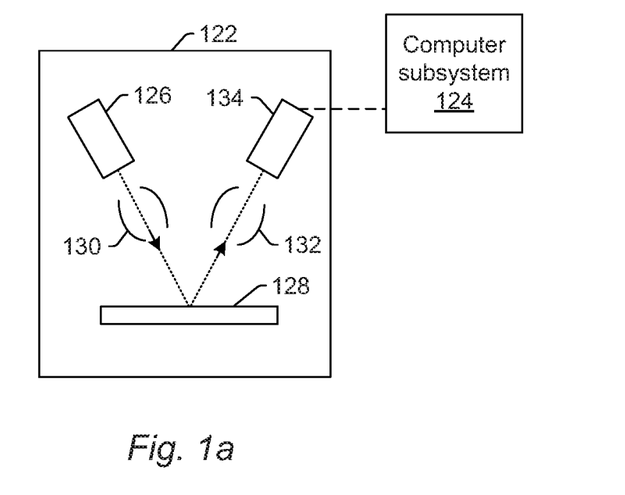

Although the tool is described above as being an optical or light-based tool, the tool may be an electron beam based tool. For example, in one embodiment, the output generated for the specimen includes electron beam based output. In one such embodiment shown in FIG. 1a, the electron beam based tool includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam based tool may be configured to use multiple modes to generate electron beam based output for the specimen as described further herein (e.g., with different illumination angles, collection angles, etc.). The multiple modes of the electron beam based tool may be different in any output generation parameters of the tool.

Computer subsystem 124 may be coupled to detector 134 as described above. The detector may detect electrons returned from the surface of the specimen thereby forming electron beam based output for the specimen. The electron beam based output may include any suitable electron beam based output such as images. Computer subsystem 124 may be configured to perform one or more functions described further herein for the specimen using output generated by detector 134. Computer subsystem 124 may be configured to perform any additional step(s) described herein. A system that includes the electron beam based tool shown in FIG. 1a may be further configured as described herein.

It is noted that FIG. 1a is provided herein to generally illustrate a configuration of an electron beam based tool that may be included in the embodiments described herein. As with the optical based tool described above, the electron beam based tool configuration described herein may be altered to optimize the performance of the electron beam based tool as is normally performed when designing a commercial electron beam based tool. In addition, the systems described herein may be implemented using an existing electron beam based tool (e.g., by adding functionality described herein to an existing electron beam based tool) such as the eSxxx and eDR-xxxx series of tools that are commercially available from KLA-Tencor. For some such systems, the embodiments described herein may be provided as optional functionality of the electron beam based tool in addition to other functionality of the system))). Alternatively, the electron beam based tool described herein may be designed "from scratch" to provide a completely new electron beam based tool.

Although the tool is described above as being an optical based or electron beam based tool, the tool may be an ion beam based tool. Such a tool may be configured as shown in FIG. 1a except that the electron beam source may be replaced with any suitable ion beam source known in the art. In addition, the tool may be any other suitable ion beam based tool such as those included in commercially available focused ion beam (FIB) systems, helium ion microscopy (HIM) systems, and secondary ion mass spectroscopy (SIMS) systems.

As noted above, the tool is configured for scanning energy (e.g., light or electrons) over a physical version of the specimen thereby generating actual images for the physical version of the specimen. In this manner, the tool may be configured as an "actual" tool, rather than a "virtual" system. For example, a storage medium (not shown) and computer subsystem(s) 102 shown in FIG. 1 may be configured as a "virtual" system. In particular, the storage medium and the computer subsystem(s) are not part of optical based tool 10 and do not have any capability for handling the physical version of the specimen. In other words, in systems configured as virtual systems, the output of its one or more "detectors" may be output that was previously generated by one or more detectors of an actual tool and that is stored in the virtual system, and during the "scanning," the virtual system may replay the stored output as though the specimen is being scanned. In this manner, scanning the specimen with a virtual system may appear to be the same as though a physical specimen is being scanned with an actual system, while, in reality, the "scanning" involves simply replaying output for the specimen in the same manner as the specimen may be scanned. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents. In addition, configuring the one or more virtual systems as a central compute and storage (CCS) system may be performed as described in the above-referenced patent to Duffy. The persistent storage mechanisms described herein can have distributed computing and storage such as the CCS architecture, but the embodiments described herein are not limited to that architecture.

As further noted above, the tool may be configured to generate output of the specimen with multiple modes. In general, a "mode" can be defined by the values of parameters of the tool used for generating output for a specimen or the output used to generate images of the specimen. Therefore, modes that are different may be different in the values for at least one of the output generation (e.g., imaging) parameters of the tool. For example, in one embodiment of an optical based tool, at least one of the multiple modes uses at least one wavelength of light for illumination that is different from at least one wavelength of the light for illumination used for at least one other of the multiple modes. The modes may be different in the illumination wavelength as described further herein (e.g., by using different light sources, different spectral filters, etc.) for different modes. In another embodiment, at least one of the multiple modes uses an illumination channel of the tool that is different from an illumination channel of the tool used for at least one other of the multiple modes. For example, as noted above, the tool may include more than one illumination channel. As such, different illumination channels may be used for different modes.

In one embodiment, the process includes an inspection process. For example, the optical and electron beam based tools described herein may be configured as inspection tools. In another embodiment, the process includes a defect review process. For example, the optical and electron beam based tools described herein may be configured as defect review tools. In a further embodiment, the process includes a metrology process. For example, the optical and electron beam based tools described herein may be configured as metrology tools. In particular, the embodiments of the tools described herein and shown in FIGS. 1 and 1*a* may be modified in one or more parameters to provide different output generation capability depending on the application for which they will be used. In one such example, the tool shown in FIG. 1 may be configured to have a higher resolution if it is to be used for defect review or metrology rather than for inspection. In other words, the embodiments of the tools shown in FIGS. 1 and 1*a* describe some general and various configurations for a tool that can be tailored in a number of manners that will be obvious to one skilled in the art to produce tools having different output generation capabilities that are more or less suitable for different applications.

In another embodiment, the process includes a fabrication process. For example, the system may include a semiconductor fabrication tool configured to perform one or more fabrication processes on the specimen. In one such example, as shown in FIG. 1, the system includes semiconductor fabrication tool 106, which may be coupled to computer subsystem(s) 102 and/or any other elements of the system described herein. The semiconductor fabrication tool may include any suitable semiconductor fabrication tool and/or chamber known in the art such as a lithography track, an etch chamber, a chemical mechanical polishing (CMP) tool, a deposition chamber, a stripping or cleaning chamber, and the like. In addition, the semiconductor fabrication tool may include one or more detectors (not shown in FIG. 1) such as those described further herein that are configured to generate output for the specimen. Examples of suitable semiconductor fabrication tools that may be included in the embodiments described herein are described in U.S. Pat. No. 6,891,627 to Levy et al. issued on May 10, 2005, which is incorporated by reference as if fully set forth herein. This patent also describes examples of various detectors that may be included in or coupled to the semiconductor fabrication tool and that can generate output as described further herein. The embodiments described herein may be further configured as described in this patent.

The one or more computer subsystems are configured for acquiring output generated for a specimen by one or more detectors included in a tool configured to perform a process on the specimen. Acquiring the output may be performed using one of the output generation tools described herein by directing light or an electron beam to the specimen and detecting light or an electron beam From the specimen). In this manner, acquiring the output may be performed using the physical specimen itself and some sort of output generation (e.g., imaging) hardware. However, acquiring the output does not necessarily include imaging the specimen using imaging hardware. For example, another system and/or method may generate the output and may store the generated output in one or more storage media such as a virtual inspection system as described herein or another storage media described herein. Therefore, acquiring the output may include acquiring the output from the storage media in which it has been stored.

The component(s), e.g., component(s) 100 shown in FIG. 1, executed by the computer subsystem(s), e.g., computer subsystem 36 and/or computer subsystem(s) 102, include learning based model 104. The one or more components may be executed by the computer subsystem(s) in any suitable manner. The model is configured for performing one or more first functions using the acquired output as input to thereby generate simulated output for the specimen. The one or more first functions may include any of the first functions described herein. The simulated output may include any of the simulated output described herein, which may be generated as described further herein. The model may be further configured as described herein. The one or more computer subsystems are further configured for performing one or more second functions for the specimen using the simulated output. The one or more second functions may include any of the second functions described further herein.

In another embodiment, the learning based model includes a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed," Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

In one embodiment, the learning based model includes a deep learning model. Generally speaking, "deep learning"

(also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

Various deep learning architectures such as deep neural networks, convolutional deep neural networks, deep belief networks and recurrent neural networks have been applied to fields like computer vision, automatic speech recognition, natural language processing, audio recognition and bioinformatics where they have been shown to produce state-of-the-art results on various tasks.

In a further embodiment, the learning based model includes a neural network. For example, the model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In another embodiment, the learning based model includes a convolution neural network (CNN). For example, the embodiments described herein can take advantage of deep learning concepts such as a CNN to solve the normally intractable representation conversion problem (e.g., rendering). The model may have any CNN configuration or architecture known in the art.

In a further embodiment, the learning based model includes a deep neural network. For example, the model may be configured to have a deep learning architecture in that the model may include multiple layers, which perform a number of algorithms or transformations. In general, the number of layers in the model is not significant and is use case dependent. For practical purposes, a suitable range of layers included in the model is from 2 layers to a few tens of layers. The deep neural network may be otherwise configured as described herein. In one such embodiment, the learning based model may be configured as a deep CNN (DCNN) as described in "ImageNet Classification with Deep Convolutional Neural Networks," by Krizhevsky et al., NIPS, 2012, 9 pages, which is incorporated by reference as if fully set forth herein. The embodiments described herein may be further configured as described in this reference.

In an additional embodiment, the learning based model includes a discriminative model. Discriminative models, also called conditional models, are a class of models used in machine learning for modeling the dependence of an unobserved variable y on an observed variable x. Within a probabilistic framework, this is done by modeling the conditional probability distribution $P(y|x)$, which can be used for predicting y from x. Discriminative models, as opposed to generative models, do not allow one to generate samples from the joint distribution of x and y. However, for tasks such as classification and regression that do not require the joint distribution, discriminative models can yield superior performance. On the other hand, generative models are typically more flexible than discriminative models in expressing dependencies in complex learning tasks. In addition, most discriminative models are inherently supervised and cannot easily be extended to unsupervised learning. Application specific details ultimately dictate the suitability of selecting a discriminative versus generative model. The discriminative model may be further configured as described in the reference incorporated above by Krizhevsky. In this manner, the embodiments described herein may use a deep learning network of a discriminative type for the applications described herein (classification or regression purposes).

In some embodiments, the learning based model includes a generative model. A "generative" model can be generally defined as a model that is probabilistic in nature. In other words, a "generative" model is not one that performs forward simulation or rule-based approaches and, as such, a model of the physics of the processes involved in generating actual output (for which simulated output is being generated) is not necessary. Instead, as described further herein, the generative model can be learned (in that its parameters can be learned) based on a suitable training set of data. The generative model may be further configured as described in U.S. patent application Ser. No. 15/176,139 by Zhang et al. filed Jun. 7, 2016, which is incorporated as if fully set forth herein. The embodiments described herein may be further configured as described in this patent application. In this manner, the embodiments described herein may use a deep learning network such as a deep generative network for the applications described herein (classification or regression purposes).

In one embodiment, the learning based model includes a deep generative model. For example, the model may be configured to have a deep learning architecture in that the model may include multiple layers, which perform a number of algorithms or transformations. In general, the number of layers on one or both sides of the generative model is not significant and is use case dependent. For practical purposes, a suitable range of layers on both sides is from 2 layers to a few tens of layers.

In another embodiment, the learning based model is configured for convolution with upsampled filters. For example, the repeated combination of max-pooling and downsampling ("striding") performed at consecutive layers of DCNNs originally designed for image classification may result in feature maps with significantly reduced spatial resolution when the DCNN is employed in a fully convolutional fashion. In order to overcome this hurdle and efficiently produce denser feature maps, the downsampling operator may be removed from the last few max-pooling layers of DCNNs and instead upsample the filters in subsequent convolutional layers, resulting in feature maps computed at a higher sampling rate.

Filter upsampling amounts to inserting holes ("trous" in French) between nonzero filter taps. This technique has a long history in signal processing, originally developed for the efficient computation of the undecimated wavelet transform in a scheme also known as "algorithme à trous." Hence the term atrous convolution is commonly used as a shorthand for convolution with upsampled filters. Various flavors of this idea have been used before in the context of DCNNs. In practice, the full resolution feature maps may be recovered by a combination of atrous convolution, which computes feature maps more densely, followed by simple bilinear interpolation of the feature responses to the original image size. This scheme offers a simple yet powerful alternative to using deconvolutional layers in dense prediction tasks. Compared to regular convolution with larger filters, atrous convolution allows effectively enlarging the field of view of filters without increasing the number of parameters or the amount of computations. This embodiment of the learning based model may further be configured as described in "DeepLab: Semantic Image Segmentation with Deep Convolutional Nets, Atrous Convolution, and Fully Connected CRFs," by Chen et al., arXiv: 1606.00915v2, Jun. 2, 2016, 14 pages, which is incorporated by reference as if fully set forth herein.

In this manner, the embodiments described herein may be configured for efficient densification processes. In particular, in different applications (e.g., defect detection, CAD rendering), the image level analysis may be converted into a pixel level classification problem. A local region (patch) defined around each pixel of the image is processed by a CNN producing a classification score associated to that pixel (patch). A full image analysis may include repeating this operation for each pixel in order to produce a score map of size equal to the input image (the score map providing simultaneously the "what" and "where" information). Unfortunately, this straightforward approach is substantially inefficient (due to overlapping patches). A method inspired by the reference by Chen incorporated by reference above has been implemented. The convolutional kernels and pooling operations have been replaced by atrou convolutions. In the new setup, the image is processed as a sliding window and the operations related to the overlapping patches are fully reused (amortized).

The embodiments described herein may or may not be configured for training the learning based model(s) described herein. For example, another method and/or system may be configured to generate a trained learning based model, which can then be accessed and used by the embodiments described herein.

In one embodiment, the computer subsystem(s) are configured for training the learning based model with results generated from one or more non-learning based algorithms, and the training is performed before the one or more first functions are performed by the learning based model. In this manner, the computer subsystem(s) may train the learning based model before the model performs the one or more first functions, and the one or more first functions may be performed with a trained learning based model. For example, the embodiments described herein may use a slower conventional algorithm to be the teacher method used during training of the faster learning based model (so human intervention is not necessary to annotate events). The slower conventional algorithm may be any currently used algorithm such as a non-learning based algorithm that is used to perform one or more functions, e.g., defect detection, classification, verification, etc. The results of the slower conventional algorithm that are used to train the faster learning based model may be selected based on the one or more first functions. For example, if the one or more first functions include defect detection, then the non-learning based algorithm(s) may include a conventional defect detection algorithm. In contrast, if the one or more first functions include defect classification, then the non-learning based algorithm(s) may include a conventional defect classification algorithm. The learning based model may be trained by the pre-existing slow algorithm(s) with the full parallel systems.

In this manner, the embodiments described herein may include a training system and an inference system. The inference system may be an order of magnitude faster to implement than the training system. For example, as described further herein, the learning based model(s) described herein may be much faster than conventional algorithms. Therefore, the training algorithms may be much slower than the trained learning based model. In one such example, the resulting system will typically be a feed forward neural network with parameters that are an order of magnitude less expensive than normal computation.

In another embodiment, the one or more computer subsystems are configured for pre-training the learning based model using a mother network and training the pre-trained learning based model, and the pre-training and training are performed before the one or more first functions are performed by the learning based model. In this manner, the computer subsystem(s) may train the learning based model before the model performs the one or more first functions, and the one or more first functions may be performed with a trained learning based model. For example, robustness can be introduced into the system by varying the inputs at training time and also learning from a mother network. In particular, a mother network can be used to speed up the training process by inheriting weights (and/or any other parameters of the learning based model) from a network that was pre-trained on a set of different but related images. The different but related images may include, for example, images of specimens that have a type that is different than the type of the specimens for which the one or more functions will be performed. In one such example, the different but related images may be for one wafer type while the one or more functions will be performed for a different wafer type. In the embodiments described herein, the focus is on speeding up inference during run time by effectively spending more time on training to essentially eliminate certain sequential steps during the actual inference.

In some embodiments, the one or more computer subsystems are configured for supervised training of the learning based model with user provided information, and the training is performed before the one or more first functions are performed by the learning based model. In this manner, the computer subsystem(s) may train the learning based model before the model performs the one or more first functions, and the one or more first functions may be performed with a trained learning based model. For example, the learning based models described herein may be trained using user input. The user input may include, for example, user provided defect classifications. However, the user provided information may include any other suitable information related to the learning based model that can be used for training the learning based model. The user provided information may be acquired in any suitable manner e.g., by receiving the information through a user interface coupled to the one or more computer subsystems).

In a further embodiment, the computer system(s) are configured for generating synthetic data for the specimen and training the learning based model using the synthetic data. For example, the embodiments described herein may be augmented by other methods to add richness to the data set used for training. For example, the training examples may be augmented with artificial examples including noise to make the training more generalizable. In one such example, unique training examples may be added based on knowledge of physics to thereby inject modeled noise or even defect structures that can be inserted into images even though they may not have physically occurred in the training samples. Examples of methods and systems that can be used to generate and use synthetic data to train a model such as those described herein are provided in U.S. patent application Ser. No. 15/394,790 by Bhaskar et al. filed Dec. 29, 2016, which is incorporated by reference as if fully set forth herein. The embodiments described herein may be further configured as described in this patent application.

In another embodiment, the learning based model is configured for performing the one or more first functions using the acquired output as a first input and information for the specimen as a second output. For example, the embodiments described herein may include a neural network which when implemented with a CNN (e.g., as described by Krizhevsky in the reference incorporated above) can combine channels of information in the front end in a much cheaper manner because the neural network learns the representation mapping between the various input channels and the desired output result. Modeling performed by the inventors has shown that the computational expense of adding 3 channels in the case of electron beam based die-to-database detection was only on the order of 15 to 20% of the cost of a single channel. Furthermore, the neural network usually does not have branching and other loops and is thus typically much faster.

In one such embodiment, the information for the specimen includes design data for the specimen. For example, the embodiments described herein may use input to the learning based model that includes images and/or image data or signals for the specimen as well as design data for the specimen. The design data may include CAD and/or an image simulated from the design data such as a registered rendered CAD image. The images may be used with the design data as described further herein.

In some such embodiments, the learning based model is configured for altering the one or more first functions based on the design data. For example, the learning based model may learn to use the design data in the manner it sees fit as opposed to the conventional method of thinking of it as render/subtract, making robust comparisons (e.g., adaptive thresholding). In one such example, in the case of defect detection that is performed in the one or more first functions, the design data may be used to perform defect detection with one or more parameters (e.g., a threshold) in different parts of the specimens, which are determined based on the design data. The parameter(s) that are used for the one or more functions performed in different parts of the specimen may be learned by the learning based model in any suitable manner (e.g., based on a training data set and the parameters used to perform the one or more functions in accordance with the training data set).

The embodiments described herein may be configured such that a single network architecture essentially solves three different use cases in the case of inspection (e.g., electron beam inspection): single image detection, classification, and die-to-database inspection. For example, in another embodiment, the one or more first functions include labeling pixels in the output as associated with defects or as not associated with defects. In an additional embodiment, the one or more first functions include identifying a classification of defects detected on the specimen. In some embodiments, the one or more first functions include generating a reference for the specimen, and the one or more second functions include comparing the reference to the output and detecting defects on the specimen based on results of the comparing. The last use case is an example of how an additional channel of information hardly changes the computational burden since most of the cost comes from the weights or the parameters which are downstream of the input channel. The learning based model may also learn to use the design data in the manner it sees fit as opposed to the conventional method of thinking of it as render/subtract, making robust comparisons (e.g., adaptive thresholding). All of these steps may be performed "under the hood" by the learning based model in one fell swoop. Therein lies an advantage of the embodiments described herein.

Labeling pixels in the output as associated with defects or as not associated with defects may include generating a score for pixels in the output such as non-defectiveness scores (SNDs) and defectiveness scores (SDs). The SND for a pixel may therefore represent the probability score of no defect at that pixel while the SD for a pixel may represent the probability score for a defect at that pixel. Labeling the pixels in the output as associated with defects or as not associated with defects may include single image detection (SID), which may be performed as described in U.S. patent application Ser. No. 15/353,210 by Bhaskar et al. filed Nov. 16, 2016, which is incorporated by reference as if fully set forth herein. The embodiments described herein may be further configured as described in this patent application.

In another embodiment, the one or more first functions include aligning at least a portion of the output to a reference. For example, the embodiments described herein may provide much faster alignment. In particular, the alignment between two images (a staple of many inspection algorithms) can be made much faster by the embodiments described herein. The basic approach may be actually the same, e.g., using a couple of well known slower algorithms to train a learning based model with alignment images. In this case, one can deliberately rotate and do affine transforms to synthetically create many training examples from a single image. The "ground truth" used for training the learning based model may be acquired with conventional normalized cross correlation (NCC) algorithms, hierarchical down sampled images, and feature based saliency point algorithms. In other words, results produced by conventional slower algorithms may be used and considered to be the "ground truth." In this manner, the embodiments described herein may train the learning based model using conventional alignment algorithms such as NCC or feature extraction or any such method, which may be augmented by synthetically transforming the image input with known shifts, rotations, etc. So for example, to align two images, a classical approach is to use NCC, which takes an image A and a template B and runs a pixel by pixel convolution operation (shifts through the alignment search, thus the window could be 5 pixels by 5 pixels to account for 5 pixel shifts). The resulting image C is then examined for peaks to identify the shift in which the maximum occurred. Another way in which alignment is performed is by "feature extraction or salient feature detection" For example, features and salient features such as corners may be extracted by some alignment algorithms and then used for alignment of one image to another. So to summarize, during training, we may use a slower algorithm like NCC or saliency point detection, create numerous artificial misalignments and train a learning based model to detect the misalignment. The learning based model learns the complex parameters including what it needs to do for fine interpolation. The learning based model will have far fewer parameters and be much faster since it is a deep neural network or another learning based model described herein. This model may be related to generative approaches (e.g., as in the above-incorporated by reference patent application by Zhang), but usually the algorithm is looking for a simple affine transform (dx, dy, drotation, or dwrap).

In a further embodiment, the one or more second functions include detecting defects on the specimen based on the simulated output. For example, additional algorithms can be sped up using the learning based models described herein. In one example, the laser DF HLAT algorithm, which is used by some commercially available inspection systems from KLA-Tencor, may be sped up using the embodiments described herein. For example, there may be multiple (e.g., three) channels in some DF inspection tools. The embodiments described herein may be configured to teach the learning based models described herein with conventional HLAT algorithms, augment the HLAT algorithm for making the system robust, and then use a much cheaper system for inference. A typical GPU has 7 TFLOPS of data vs. a conventional CPU that has 2-3 TFLOPS of data. For inference purposes, without expensive branching and looping for histograms, it may be possible to achieve a minimum of 2.5× and potentially as large as 10× speed ups.

In some embodiments, the output generated for the specimen by the one or more detectors includes output generated in multiple modes. For example, the systems described herein often have multi-sensor inputs such as (hut not limited to) RUB for CCD microscope imaging systems, multiple perspectives in electron beam review and inspection, multiple collectors in the case of laser scanning inspection systems, and multiple sequential collections of patches in the case of BBP inspectors. The computations for such a system either are bloated by a factor equivalent to their sensory inputs (RUB) or delayed by the sequential nature of the grabs (N patches). Such systems are candidates for replacement by the embodiments described herein. For example, the embodiments described herein may include a learning based model such as a neural network or other learning based model described herein which when implemented with a CNN (e.g., as described by Krizhevsky in the reference incorporated above) can combine channels of information in the front end in a much cheaper manner because the learning based model learns the representation mapping between the various input channels and the desired output result. Modeling performed by the inventors has shown that the computational expense of adding 3 channels in the case of electron beam based die-to-database detection was only on the order of 15 to 20% of the cost of a single channel. Furthermore, learning based models such as neural networks usually do not have branching and other loops and are thus typically much faster.

In one such example, in the case of multiple perspective electron beam images, instead of having the same algorithm run in parallel on all the different channels, the learning based model can be trained to fuse the data at the input channel itself and will result in only 15% extra cost as opposed to 300% for 3 channels. In another such example, in the case of multiple collectors for laser scanning systems which operate in a substantially cost sensitive market, the multiple parallel channels of computation will only be used during a training period (using say the HLAT algorithm) and will be replaced by a learning based model for defect detection during inference.

In another embodiment, the one or more computer subsystems are configured for acquiring additional output generated for an additional specimen by one or more additional detectors included in an additional tool configured to perform a process on the additional specimen, the learning based model is configured for performing the one or more first functions using the acquired additional output as the input to thereby generate the simulated output for the additional specimen, and the one or more computer subsystems are configured for performing the one or more second functions for the additional specimen using the simulated output. For example, the embodiments described herein may be configured as a centralized system that includes multiple GPUs and CPUs that can be shared amongst several of the families of machines so that the relatively expensive training part of the system could be amortized over several platforms. The tool and the additional tool may be of the same type (e.g., the same make and model). Therefore, the detector(s) and the additional detector(s) may have the same configuration. The output and the additional output may also be of the same type (e.g., the output and the additional output may both be image signals). In this manner, once a learning based model has been trained as described herein, it can be used to perform the one or more first functions for multiple specimens using output generated by only one tool or multiple tools.

In addition to the one or more second functions described above, the one or more second functions may vary depending on the one or more first functions. For example, if the one or more first functions include defect detection, the one or more second functions may include generating inspection results for the specimen based on the results of the one or more first functions and/or performing one or more additional functions using the results of the defect detection. The one or more second functions may also be performed using conventional (or non-learning based aigorithm(s) and/or method(s)). For example, if the one or more first functions include defect detection, the one or more second functions may include defect classification performed using a non-learning based method and/or algorithm. However, the one or more second functions may be performed using a learning based model. Therefore, different functions may be performed for a specimen with different learning based models, each of which may be trained and/or configured as described herein. In one such example, the one or more first functions may include defect detection performed with a first learning based model, and the one or more second functions may include defect classification performed with a second learning based model.

Additional embodiments described herein may be configured for machine learning based recipe tuning with multiple input data sets. For example, the embodiments described further herein may be configured for automated recipe tuning using many input datasets, possibly with minimal user intervention.

In currently used methods and systems for recipe tuning, users perform set up of an initial recipe and run it on one or at most on a few wafers. Usually less than 100% of defects are reviewed and classified. Currently used automatic classification techniques depend on the defect review images (e.g., SEM images) only, and no correlation score between the defect review images (e.g., SEM images) and the inspection images (e.g., optical images) is calculated. Currently used methods cannot handle a huge amount of data sets.

The currently used methods and systems have therefore a number of disadvantages. For example, the currently used methods are lacking of statistics especially if the defect is very hard to catch and only a couple of the reviewed defects are actually defects of interest (DOIs). In addition, the tuning is only performed on a couple of wafers as it is too time consuming to do this on many more wafers. Recipes are also sometimes tuned wrong because defect review image to inspection image correlation (e.g., SEM to optical image correlation) has not been performed or has not been performed on enough examples.

In one embodiment, the one or more computer subsystems are configured for training the learning based model with results generated from one or more non-learning based algorithms, the training is performed before the one or more first functions are performed by the learning based model, and the results generated from the one or more non-learning based algorithms include defect classification results. For example, the embodiments described herein may be configured for generating a lot of data that will be used to derive substantially stable nuisance suppression classifiers. The training may be performed in this embodiment as described further herein. The defect classification results may be generated as described further herein.

In one such embodiment, the defect classification results are generated by running a hot scan on another specimen to thereby detect defects on the other specimen, reviewing at least a portion of the detected defects, and classifying at least the portion of the detected defects using at least results of the reviewing. For example, inspection output may be aligned to design data for sub pixel accuracy patch to design alignment to later align the SEM image with the optical image or to define a substantially small area around the defect that is used for calculating local attributes or even deriving new attributes. Aligning the inspection output to the design data may be performed as described in the above-referenced patent to Kulkarni et al. Once the inspection output has been aligned to the design data, the defect review image can also be aligned to the design data. Therefore, the design data may serve as a common reference for the inspection output and the defect review output and aligning both outputs to the common reference thereby aligns the two outputs to each other. The local and new attributes may include attributes of the defect and/or patterned features of the design located proximate to (e.g., in the same location as and/or adjacent to) the defect. In addition, a hot scan may be run on the specimen, and the reported sites may be reviewed. A "hot" scan can be generally defined as a process in which a substantially low threshold (e.g., a threshold at or near the noise floor of output generated by an inspection system for the specimen) is used to detect defects on a specimen. During review, test and reference images are collected and used to calculate a difference image (e.g., by subtracting the reference image from its corresponding test image). The defect review image is aligned to design. Using design coordinates, the defect image can be accurately overlaid with the inspection image.

In some such embodiments, classifying at least the portion of the detected defects is performed by a user. For example, the user may classify some of the defects to create a learning data set for a learning based model to process the data. In another example, the user may classify all of the defects to create the learning data set. The user may perform classifying at least the portion of the detected defects in any suitable manner using any suitable method and/or system. Alternatively, deep learning may be performed on patch images to classify defects. For example, a learning based model such as one of those described herein may be configured and trained to classify defects on the specimen.

In another such embodiment, the one or more first functions include predicting which defects detected with the output are DIOs. For example, once the learning based model is stable enough, it will predict which defects detected by inspection are most likely DOI. Predicting which defects detected with the output are DOIs may be performed as described further herein.

In one such embodiment, the predicting is performed based on defect attributes determined from the output. In another such embodiment, the predicting is performed based on the output. In a further such embodiment, the predicting is performed based on images generated from the output. For example, the learning based model can use defect attributes or image information (including test, reference, and/or difference images) from the defect review and/or inspection tool. In this manner, a learning based model, trained as described further herein, may be used to perform autoclassification for defects from many wafers and lots.

In one embodiment, the learning based model is configured for generating a classifier for nuisance filtering for an inspection process for the specimen based on results of the inspection process generated for multiple specimens in multiple lots, and the results of the inspection process include image characteristics, defect attributes, or a combination thereof. For example, the embodiments described herein may be configured for deriving substantially stable recipe tuning parameters. In one such example, the image characteristics as well as the defect attributes may be collected from defects from many wafers and many lots. A learning based model may be used to generate a classifier for nuisance filtering based on this huge amount of data which allows finding substantially stable attributes and substantially reliable threshold settings. The image characteristics may include any characteristics of any image based output that can be determined from the output generated by inspection. The defect attributes can be determined in any suitable manner and may include any suitable defect attributes.

In another embodiment, the learning based model is configured for generating a difference filter for detecting defects for an inspection process for the specimen based on results of the inspection process generated for multiple specimens in multiple lots, and the results of the inspection process include image characteristics, defect attributes, or a combination thereof. For example, the embodiments described herein may be configured for deriving substantially stable recipe tuning parameters. In particular, the learning based model may be used to calculate an optimized difference filter to detect the defects and feed this information back to the inspection system together with an optimized classifier and sampling strategy. The image characteristics may include any characteristics of any image based output that can be determined from the output generated by inspection. The defect attributes can be determined in any suitable manner and may include any suitable defect attributes.

The embodiments described above have a number of advantages over currently used methods and systems. For example, a human would not have time to go through as many patch images as a learning based model can. The embodiments described herein can also be implemented in existing software such as the Klarity software that is commercially available from KLA-Tencor or as an addition to such software where the optical patch images and the SEM images can be collected and viewed. Furthermore, due to the huge amount of data available in software such as Klarity (e.g., hundreds of wafers instead of only one wafer on the tool), statistically meaningful predictions for inline classifiers and threshold settings can be made and substantially stable defect attributes can be identified. Using the new learning based models described herein during inspection will improve the sensitivity of the inspection to key (important) DOIs. Finding key DOIs can save users of inspection tools millions of dollars.

Each of the embodiments of each of the systems described above may be combined together into one single embodiment.

Another embodiment relates to a computer-implemented method for performing one or more functions for a specimen using output simulated for the specimen. The method includes acquiring output generated for a specimen by one or more detectors included in a tool configured to perform a process on the specimen. The method also includes performing one or more first functions using the acquired output as input to a learning based model to thereby generate simulated output for the specimen. The learning based model is included in one or more components executed by one or more computer subsystems. In addition, the method includes performing one or more second functions for the specimen using the simulated output. The one or more second functions are performed by the one or more computer subsystems.

Each of the steps of the method may be performed as described further herein. The method may also include any other step(s) that can be performed by the system, computer subsystem(s), component(s), and/or model(s) described herein. The one or more computer systems, the one or more components, and the model may be configured according to any of the embodiments described herein, e.g., computer subsystem(s) 102, component(s) 100, and model 104, respectively. In addition, the method described above may be performed by any of the system embodiments described herein.

Figure 2:
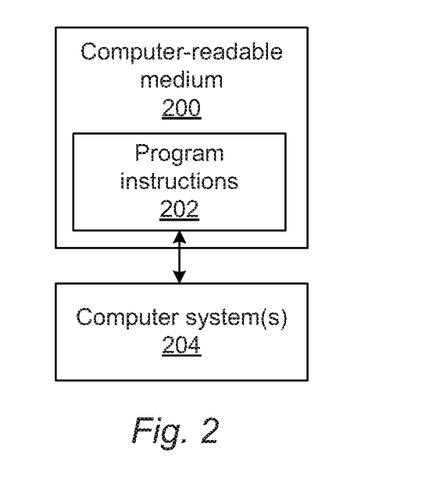
FIG. 2 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for performing one or more functions for a specimen using output simulated for the specimen. One such embodiment is shown in FIG. 2. In particular, as shown in FIG. 2, non-transitory computer-readable medium 200 includes program instructions 202 executable on computer system(s) 204. The computer-implemented method may include any step(s) of any method(s) described herein.

Program instructions 202 implementing methods such as those described herein may be stored on computer-readable medium 200. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 204 may be configured according to any of the embodiments described herein.

Further modifications and alternative embodiments of various aspects of the invention will be apparent to those skilled in the art in view of this description. For example, methods and systems for performing one or more functions for a specimen using output simulated for the specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to perform one or more functions for a specimen using output simulated for the specimen, comprising:
   one or more detectors included in a tool configured to perform a process on the specimen, wherein the one or more detectors generate output for the specimen during the process;
   one or more computer subsystems configured for acquiring the output generated for the specimen by the one or more detectors; and
   one or more components executed by the one or more computer subsystems, wherein the one or more components comprise a learning based model configured for performing one or more first functions using the acquired output as input to thereby generate simulated output for the specimen, wherein the learning based model is further configured for performing the one or more first functions using the acquired output as a first input and information for the specimen as a second input, and wherein the one or more computer subsystems are further configured for performing one or more second functions for the specimen using the simulated output; and
   wherein the learning based model is further configured for convolution with upsampled filters, and wherein the learning based model is formed by removing one or more last max-pooling layers of a deep convolutional neural network and inserting upsampling filters in subsequent convolutional layers such that the learning based model produces a denser feature map than the deep convolutional neural network.

2. The system of claim 1, wherein the learning based model comprises a machine learning model.

3. The system of claim 1, wherein the learning based model comprises a deep learning model.

4. The system of claim 1, wherein the learning based model comprises a neural network.

5. The system of claim 1, wherein the learning based model comprises a convolution neural network.

6. The system of claim 1, wherein the learning based model comprises a deep neural network.

7. The system of claim 1, wherein the learning based model comprises a discriminative model.

8. The system of claim 1, wherein the learning based model comprises a generative model.

9. The system of claim 1, wherein the one or more computer subsystems are further configured for training the learning based model with results generated from one or more non-learning based algorithms, and wherein the training is performed before the one or more first functions are performed by the learning based model.

10. The system of claim 1, wherein the one or more computer subsystems are further configured for pre-training the learning based model using a mother network and training the pre-trained learning based model, and wherein the pre-training and the training are performed before the one or more first functions are performed by the learning based model.

11. The system of claim 1, wherein the one or more computer subsystems are further configured for supervised training of the learning based model with user provided information, and wherein the training is performed before the one or more first functions are performed by the learning based model.

12. The system of claim 1, wherein the one or more computer subsystems are further configured for generating synthetic data for the specimen and training the learning based model using the synthetic data.

13. The system of claim 1, wherein the information for the specimen comprises design data for the specimen.

14. The system of claim 13, wherein the learning based model is further configured for altering the one or more first functions based on the design data.

15. The system of claim 1, wherein the one or more first functions comprise labeling pixels in the output as associated with defects or as not associated with defects.

16. The system of claim 1, wherein the one or more first functions comprise identifying a classification of defects detected on the specimen.

17. The system of claim 1, wherein the one or more first functions comprise generating a reference for the specimen, and Wherein the one or more second functions comprise comparing the reference to the output and detecting defects on the specimen based on results of the comparing.

18. The system of claim 1, wherein the one or more first functions comprise aligning at least a portion of the output to a reference.

19. The system of claim 1, wherein the one or more second functions comprise detecting defects on the specimen based on the simulated output.

20. The system of claim 1, wherein the output generated for the specimen by the one or more detectors comprises output generated in multiple modes.

21. The system of claim 1, wherein the one or more computer subsystems are further configured for acquiring additional output generated for an additional specimen by one or more additional detectors included in an additional tool configured to perform a process on the additional specimen, wherein the learning based model is further configured for performing the one or more first functions using the acquired additional output as the input to thereby generate the simulated output for the additional specimen, and Wherein the one or more computer subsystems are further configured for performing the one or more second functions for the additional specimen using the simulated output.

22. The system of claim 1, wherein the one or more computer subsystems are further configured for training the learning based model with results generated from one or more non-learning based algorithms, wherein the training is performed before the one or more first functions are performed by the learning based model, and wherein the results generated from the one or more non-learning based algorithms comprise defect classification results.

23. The system of claim 22, wherein the defect classification results are generated by running a hot scan on another specimen to thereby detect defects on the other specimen, reviewing at least a portion of the detected defects, and classifying at least the portion of the detected defects using at least results of the reviewing.

24. The system of claim 23, wherein classifying at least the portion of the detected defects is performed by a user.

25. The system of claim 22, Wherein the one or more first functions comprise predicting which defects detected with the output are defects of interest.

26. The system of claim 25, wherein said predicting is performed based on defect attributes determined from the output.

27. The system of claim 25, wherein said predicting is performed based on the output.

28. The system of claim 25, wherein said predicting is performed based on images generated from the output.

29. The system of claim 1, wherein the learning based model is further configured for generating a classifier for nuisance filtering for an inspection process for the specimen based on results of the inspection process generated for multiple specimens in multiple lots, and wherein the results of the inspection process comprise image characteristics, defect attributes, or a combination thereof.

30. The system of claim 1, wherein the learning based model is further configured for generating a difference filter for detecting defects for an inspection process for the specimen based on results of the inspection process generated for multiple specimens in multiple lots, and wherein the results of the inspection process comprise image characteristics, defect attributes, or a combination thereof.

31. The system of claim 1, wherein the process comprises a metrology process.

32. The system of claim 1, wherein the process comprises an inspection process.

33. The system of claim 1, wherein the process comprises a fabrication process.

34. The system of claim 1, wherein the output comprises optical based output.

35. The system of claim 1, wherein the output comprises electron beam based output.

36. The system of claim 1, wherein the specimen is a wafer.

37. The system of claim 1, wherein the specimen is a reticle.

38. A non-transitory computer-readable medium, storing program instructions executable on one or more computer systems for performing one or more functions for a specimen using output simulated for the specimen, wherein the computer-implemented method comprises:

rating output for a specimen with one or more detectors included in a tool configured to perform a process on the specimen, wherein the one or more detectors generate the output for the specimen during the process;

acquiring the output generated for the specimen by the one or more detectors;

performing one or more first functions using the acquired output as input to a learning based model to thereby generate simulated output for the specimen, wherein the learning based model performs the one or more first functions using the acquired output as a first input and information for the specimen as a second input, wherein the learning based model is included in one or more components executed by the one or more computer systems, wherein the learning based model is further configured for convolution with upsampled filters, and wherein the learning based model is formed by removing one or more last max-pooling layers of a deep convolutional neural network and inserting upsampling filters in subsequent convolutional layers such that the learning based model produces a denser feature map than the deep convolutional neural network; and performing one or more second functions for the specimen using the simulated output, wherein the one or more second functions are performed by the one or more computer systems.

39. A computer-implemented method for performing one or more functions for a specimen using output simulated for the specimen, comprising:

generating output for a specimen with one or more detectors included in a tool configured to perform a process on the specimen, wherein the one or more detectors generate the output for the specimen during the process;

acquiring the output generated for the specimen by the one or more detectors;

performing one or more first functions using the acquired output as input to a learning based model to thereby generate simulated output for the specimen, wherein the learning based model performs the one or more first functions using the acquired output as a first input and information for the specimen as a second input, wherein the learning based model is included in one or more components executed by one or more computer systems, wherein the learning based model is further configured for convolution with upsampled filters, and wherein the learning based model is formed by removing one or more last max-pooling layers of a deep convolutional neural network and inserting upsampling filters in subsequent convolutional layers such that the learning based model produces a denser feature map than the deep convolutional neural network; and performing one or more second functions for the specimen using the simulated output, wherein the one or more second functions are performed by the one or more computer systems.

* * * * *

UNITED STATES PATENT AND TRADEMARK OFFICE
CERTIFICATE OF CORRECTION

PATENT NO. : 10,360,477 B2
APPLICATION NO. : 15/402169
DATED : July 23, 2019
INVENTOR(S) : Kris Bhaskar et al.

It is certified that error appears in the above-identified patent and that said Letters Patent is hereby corrected as shown below:

In the Claims

Column 27 Line 1 please delete "rating" and substitute --generating--.

Signed and Sealed this
Eighteenth Day of August, 2020

Andrei Iancu
*Director of the United States Patent and Trademark Office*